United States Patent [19]
Dekker

[11] Patent Number: 6,049,562
[45] Date of Patent: Apr. 11, 2000

[54] MULTI-BRANCH FREQUENCY-HOPPING RECEIVER

[75] Inventor: André Dekker, Oulu, Finland

[73] Assignee: Nokia Telecommunications Oy, Espoo, Finland

[21] Appl. No.: 08/913,065

[22] PCT Filed: Dec. 20, 1996

[86] PCT No.: PCT/FI96/00684

§ 371 Date: Nov. 19, 1997

§ 102(e) Date: Nov. 19, 1997

[87] PCT Pub. No.: WO97/24817

PCT Pub. Date: Jul. 10, 1997

[30] Foreign Application Priority Data

Dec. 29, 1995 [FI] Finland ..................... 956357

[51] Int. Cl.$^7$ ........................................ H04K 1/00
[52] U.S. Cl. ..................... 375/202; 375/349; 375/350
[58] Field of Search ...................... 375/202, 260, 375/344, 349, 350

[56] References Cited

U.S. PATENT DOCUMENTS

| | | |
|---|---|---|
| 4,956,644 | 9/1990 | Leahy et al. .............................. 342/351 |
| 4,970,479 | 11/1990 | Landt et al. . |
| 5,177,767 | 1/1993 | Kato ........................................ 375/200 |
| 5,323,391 | 6/1994 | Harrison .................................... 370/70 |

FOREIGN PATENT DOCUMENTS

| | | |
|---|---|---|
| 166 551 | 1/1986 | European Pat. Off. . |
| 83/03505 | 10/1983 | WIPO . |

*Primary Examiner*—Amanda T. Le
*Attorney, Agent, or Firm*—Pillsbury Madison & Sutro

[57] ABSTRACT

A method and an equipment for controlling a multi-branch frequency-hopping receiver equipment used in a radio station, especially in a base station of a cellular radio system onto a desired frequency when a band-pass filter (BPF2) responsive to an external control signal (VBPF) has been arranged for each branch of the receiver equipment, the control signal (VBPF) of the band-pass filter being controlled in sync with frequency hopping. The control signals (VBPF) of the band-pass filter (BPF2) are determined for each frequency (C) and each filter (BPF2) and this information is stored in a tuning voltage memory (TVM) from which it is retrieved in sync with frequency hopping.

21 Claims, 8 Drawing Sheets

MULTI-BRANCH FREQUENCY-HOPPING RECEIVER

This application is the national phase of international application PCT/FI96/00684, filed Dec. 20, 1996 which was designated the U.S.

BACKGROUND OF THE INVENTION

The invention relates to a multi-branch frequency-hopping receiver used in base stations of a cellular radio system, for example.

Figure 1:
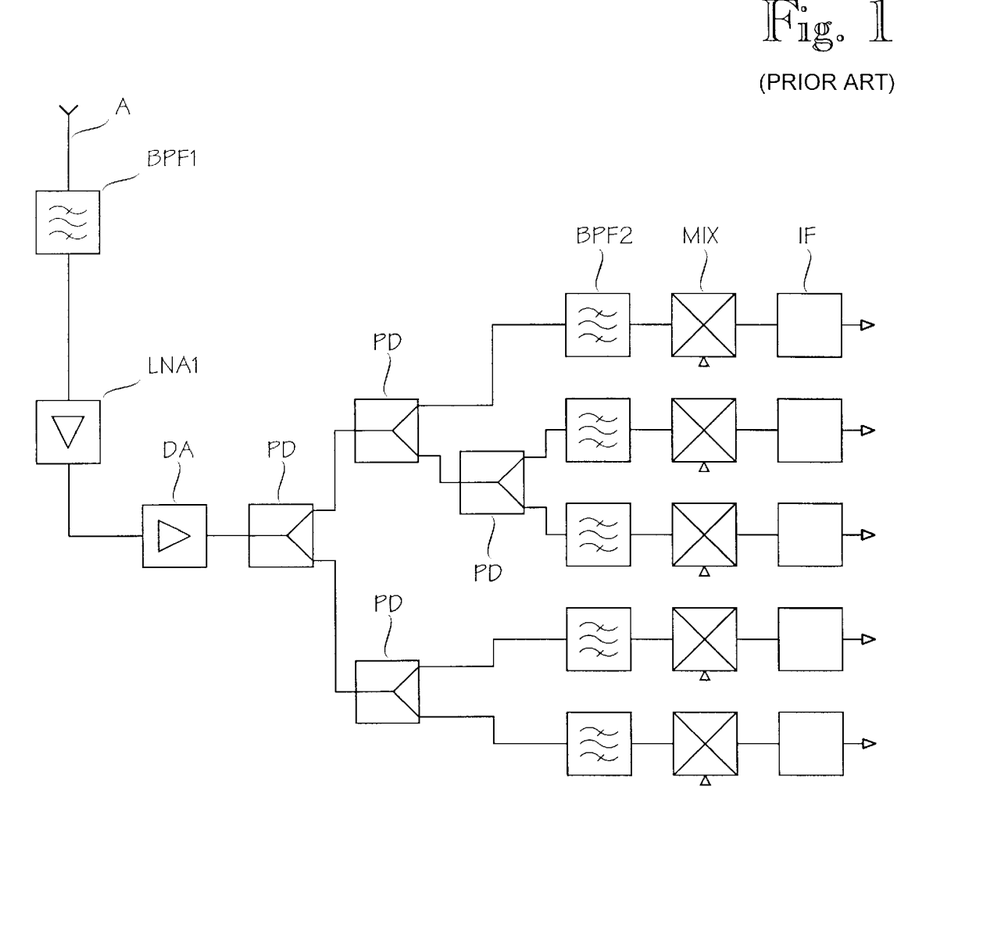
FIG. 1 shows a prior art multi-branch frequency-hopping receiver.

FIG. 1 shows as a block diagram a method in which a plurality of receivers have been connected to a common antenna A in a multi-branch radio station. The study of the system is affected by the fact that it concerns a frequency-hopping system, in which case the components of the system cannot be very selective on a fixed frequency. This kind of receiver can also be referred to as being "multichannel". In addition to this meaning, the term "channel" may refer, depending on the context, to the nominal frequency of a radio link or a combination of a frequency and a time slot, for example. In order to avoid confusion, in the present application the term "channel" refers to the nominal frequency of a radio link or a combination of a frequency and a time slot, in which case parallel receivers are referred to as "receiver branches".

A broad band-pass filter BPF1 follows antenna A in the direction of propagation of the received signal. It passes through the whole frequency area of the system. The function of the band-pass filter BPF1 is to attenuate image frequencies and other non-desired components of the spectrum. The next stage is a low noise amplifier LNA which is followed by a distribution amplifier DA. A signal is conducted from the distribution amplifier DA to all the receivers of the station so that a second band-pass filter BPF2, a mixer MIX and an intermediate frequency stage IF are at the front end of each receiver. The number of receiver branches in FIGS. 1 to 5 is 5 as an example, but there may be more or less of them within reason.

The coupling of the distribution amplifier DA to the receivers is not possible simply by connecting the inputs of the filters BPF2 in parallel as because of frequency hopping, the filters BPF2 cannot be made selective enough. This connection in parallel would cause various adapting problems. Instead, a signal is conducted to the band-pass filters BPF2 via a chain of power dividers PD.

It is previously known that in receivers implemented without frequency hopping, the broadband band-pass filters BPF2 of FIG. 1 can be replaced by narrowband filters. In this case the inputs of the filters BPF2 can be connected together under certain conditions and they can be connected directly to a low-noise amplifier LNA without the distribution amplifier DA and the divider chain PD.

As the divider divides the power into two, its theoretical attenuation is 3 dB, but in practice, attenuation is about 3.5 dB. In the case of five receiver branches the attenuation of three branches is 7 dB and of two branches 10.5 dB.

A low-noise amplifier LNA and a distribution amplifier DA generate noise in the image frequencies of the mixer. Therefore it is necessary to have after them band-pass filters BPF2 whose function it is to attenuate the penetration/leakage of the local oscillators of the mixers from one receiver to another. Down-conversion takes place in high signal level mixers MIX which are controlled by frequency-hopping local oscillators which are not shown separately. After the mixers MIX, the desired signals are on a fixed frequency, in which case they can be processed further.

For example, many high requirements set for the distribution amplifier DA and inflexibility of connections are problems in the prior art solution described above. The distribution amplifier DA has to generate high output power (about 1 W in the GSM environment). It has to be low-noise and very linear to avoid intermodulation distortion.

The second problem in the prior art solution is the inflexibility of the connection caused by the divider chain. The divider chain PD is formed of power dividers which induce the required impedance matchings. If there are N receivers, $N-1_1$ dividers are needed altogether and at least some of the signal paths have them in sequence $log_2 N$ rounded up to the next integral number. For example, 5 to 8 receivers require at most 3 successive dividers but the ninth receiver would then have a chain of four dividers.

The third problem with prior art receivers is provided by band-pass filters BPF2 which have to pass the whole desired frequency band but attenuate the many frequencies outside the band as much as possible. Therefore several resonators are needed there and they have to tuned, generally manually in the manufacturing stage. In addition, band-pass filters are bulky and have a high loss.

BRIEF SUMMARY OF THE INVENTION

The object of the present invention is a multi-branch frequency-hopping receiver with which the above problems are solved. The object will be attained by a method and an equipment that is characterized in that the band-pass filters BPF2 are controlled by an external control signal in sync with frequency hopping.

The advantage of the present invention is primarily that various problems associated with the distribution amplifier DA can be eliminated. Furthermore, the receiver of the invention is more flexible and reliable than the prior art receiver described above.

BRIEF DESCRIPTION OF THE SEVERAL VIEWS OF THE DRAWING

The invention will be now disclosed in more detail in association with various exemplary embodiments, wherein.

DETAILED DESCRIPTION OF THE INVENTION

Figure 2:
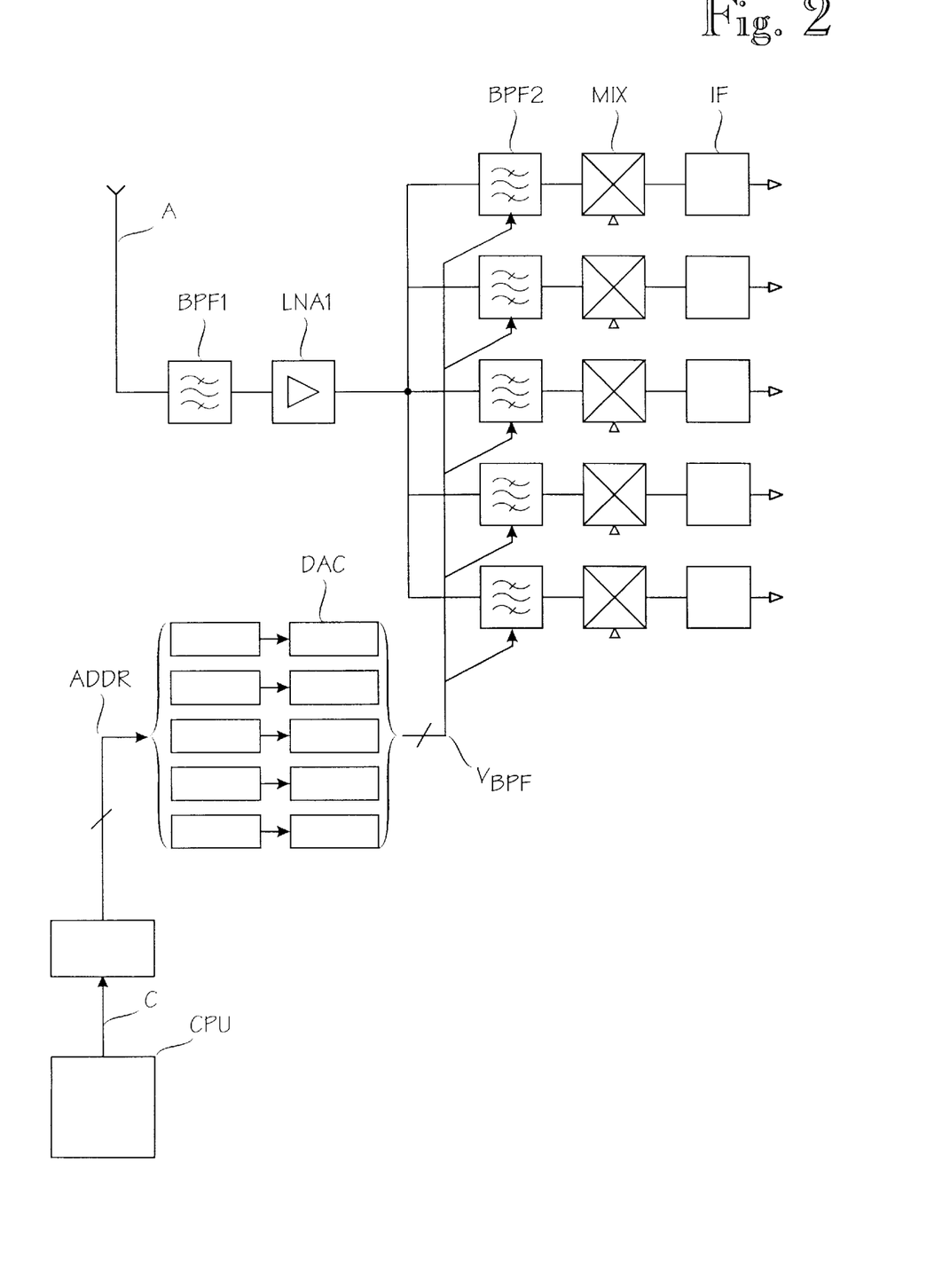
FIG. 2 shows a simple embodiment of the invention.

A block diagram of a multi-branch frequency-hopping receiver of the invention is disclosed in FIG. 2. With respect to the prior art solution shown in FIG. 1, in the receiver of the invention the distribution amplifier DA and the divider chain PD have been left out, the inputs of the filters BPF2 have been connected in parallel and they are fed directly by the low-noise amplifier LNA. Further, the filters BPF2 have been implemented so that their centre frequency can be adjusted by an external signal, preferably by voltage. The control unit CPU controls the system.

In a simple embodiment, the control of the filters BPF2 takes place so that their centre frequency as a function of the control signal has been measured in advance. This information is stored in a tuning voltage memory TVM. The addressing of the tuning voltage memory TVM will be explained below. The output of the tuning voltage memory TVM, for example a binary number is connected to the input of a D/A converter DAC (Digital to Analogue Converter). If the converter DAC has no internal holding circuit, one has to be installed in between the tuning voltage memory TVM and the converter DAC. The output of the converter DAC is connected to the control input of the filters BPF2 as a signal $V_{BPF}$.

It is obvious to those skilled in the art that especially the connection between the tuning voltage memory TVM and the D/A converters DAC in FIG. 2 (and in FIGS. 3 and 9 to be explained below) has been explained rather as cause/effect relationships than as separate equipments. It should especially be understood that a separate memory device need not be reserved for each DAC of the D/A converter but tuning voltage memories TVM may also be elements of the memory in which the other parameter data of the radio station has been stored.

In a simple embodiment, the portion of the input of the tuning voltage memory TVM, that is, the address ADDR essential for the invention includes a digital representation of the nominal frequency of channel C. The contents of the corresponding memory location, that is, the output of the tuning voltage memory TVM contains the digital representation of the control signal $V_{BPF}$ measured and stored in advance, with which representation the filter BPF2 has to be controlled in order that the centre frequency of the filter BPF2 would be equal to the nominal frequency of the channel C in question.

Figure 3:
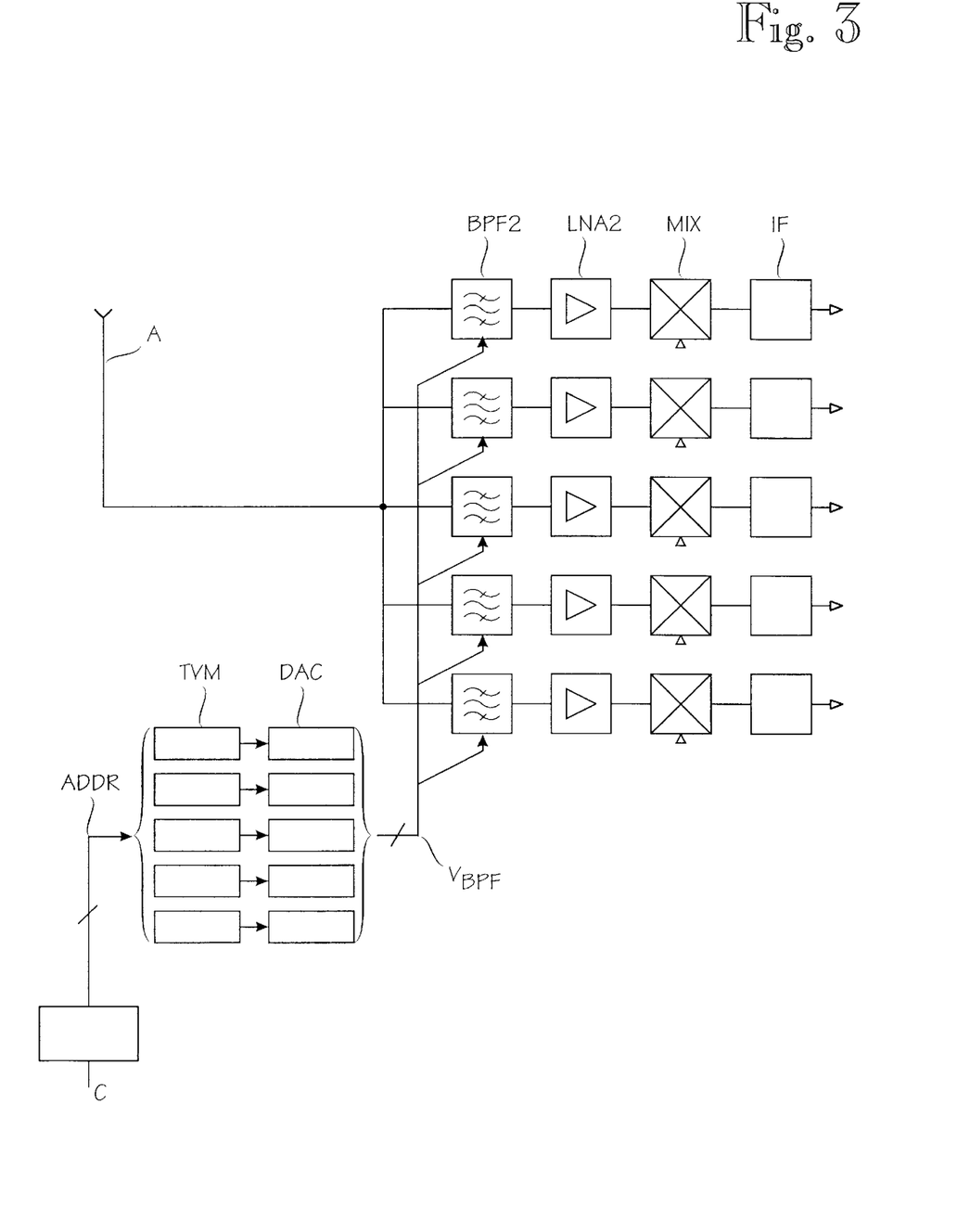
FIG. 3 shows a second embodiment of the invention where LNA amplifiers are distributed to each amplifier branch.

In an advanced embodiment of the invention shown in FIG. 3, the filters BPF2 have been connected directly to the antenna A, whereby the low-noise amplifier LNA and the first filter BPFI have been left out. This requires that the filters BPF2 have a sufficiently low loss. In this case a low-noise amplifier LNA2 has been added between the filter BPF2 and the mixer MIX in each amplifier branch. The advantage of this arrangement is that it is often easier to implement a number of amplifiers of sufficiently good quality where one signal passes than one amplifier where many signals pass at the same time. As is known, the peak power of N uncorrelated, equally strong signals is $N^2$ times the peak power of a single signal. The combined peak power of N separate amplifiers is then only 1/N of the peak power required from a common amplifier where N signals would pass at the same time. Furthermore, the assembly formed by N separate amplifiers is more reliable than a single common amplifier. If one branch of several parallel branches fails, the other branches may continue operation.

FIGS. 4 to 8 illustrate the requirements set for band-pass filters BPF2. It has been assumed in the figures that simple resonators are used in the filters. A better performance would be achieved with a double resonator but it is difficult to make two resonators follow one another over the entire possible frequency range. Furthermore, a GSM receiver is assumed to be used in FIGS. 4 to 8, the spacing between the nominal frequencies of the channels being 400 kHz. This is the minimum useful channel spacing feasible from GSM specifications. Channel spacing according to the GSM recommendations is 200 kHz, but the selectivity of mobile stations and base stations does not allow the use of this closely located channels on the same coverage area. For most operators channel spacing is 800 kHz. If channel spacing was 800 kHz, filters where quality factor Q would be half of the case of 400 kHz would be sufficient.

Figure 4:
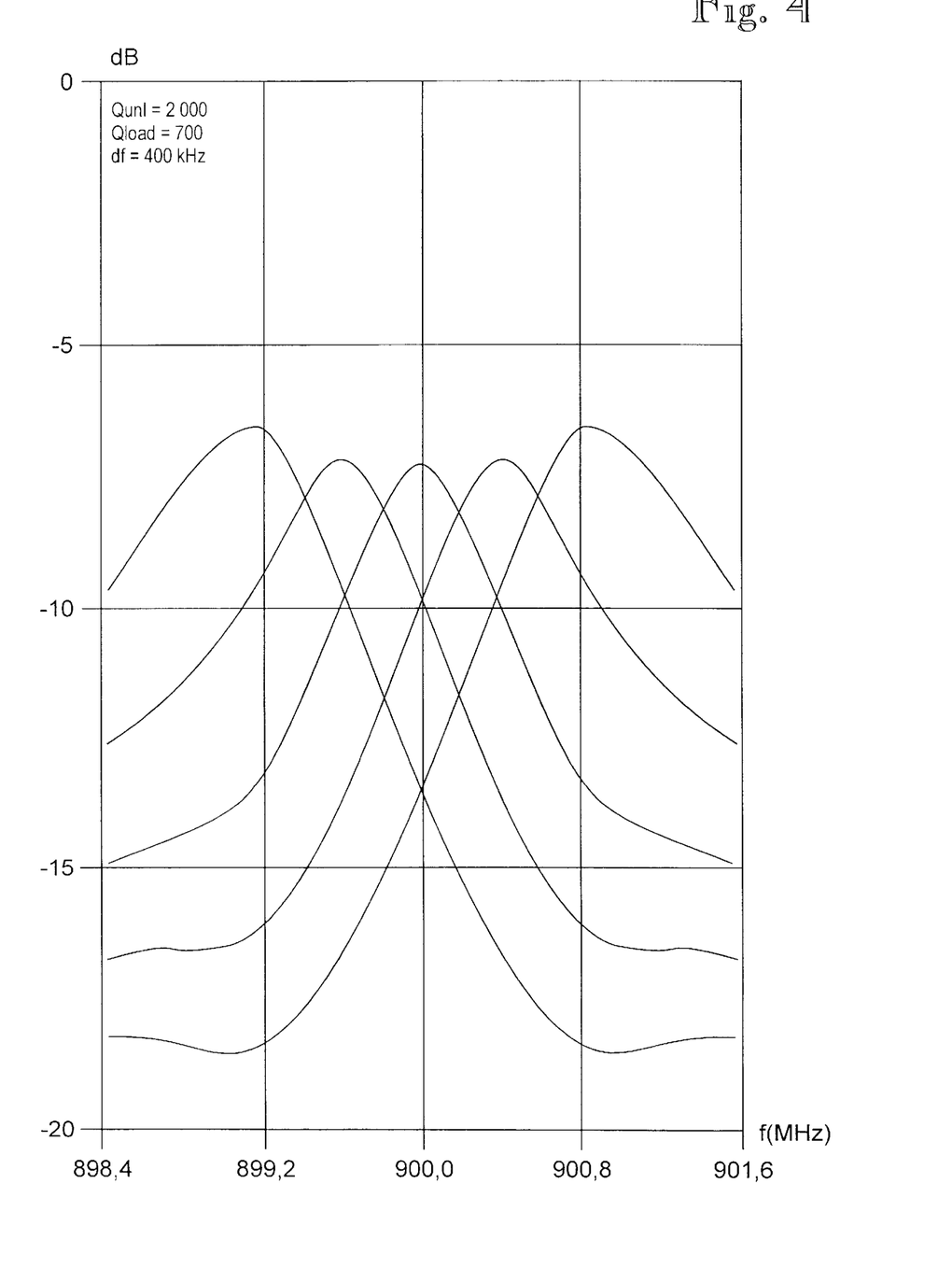
FIGS. 4 to 6 show frequency responses created as computer simulations.
Figure 5:
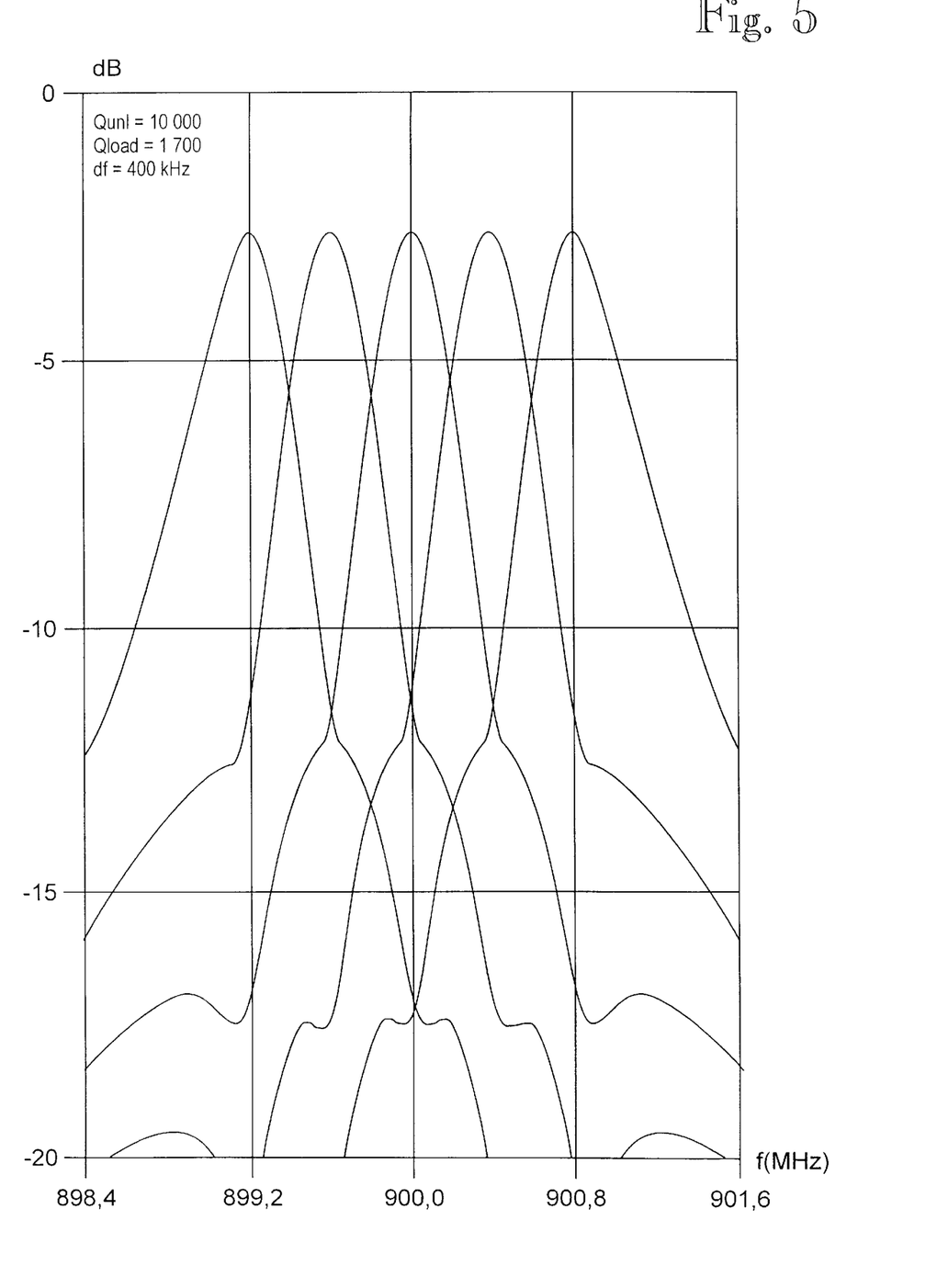
Figure 6:
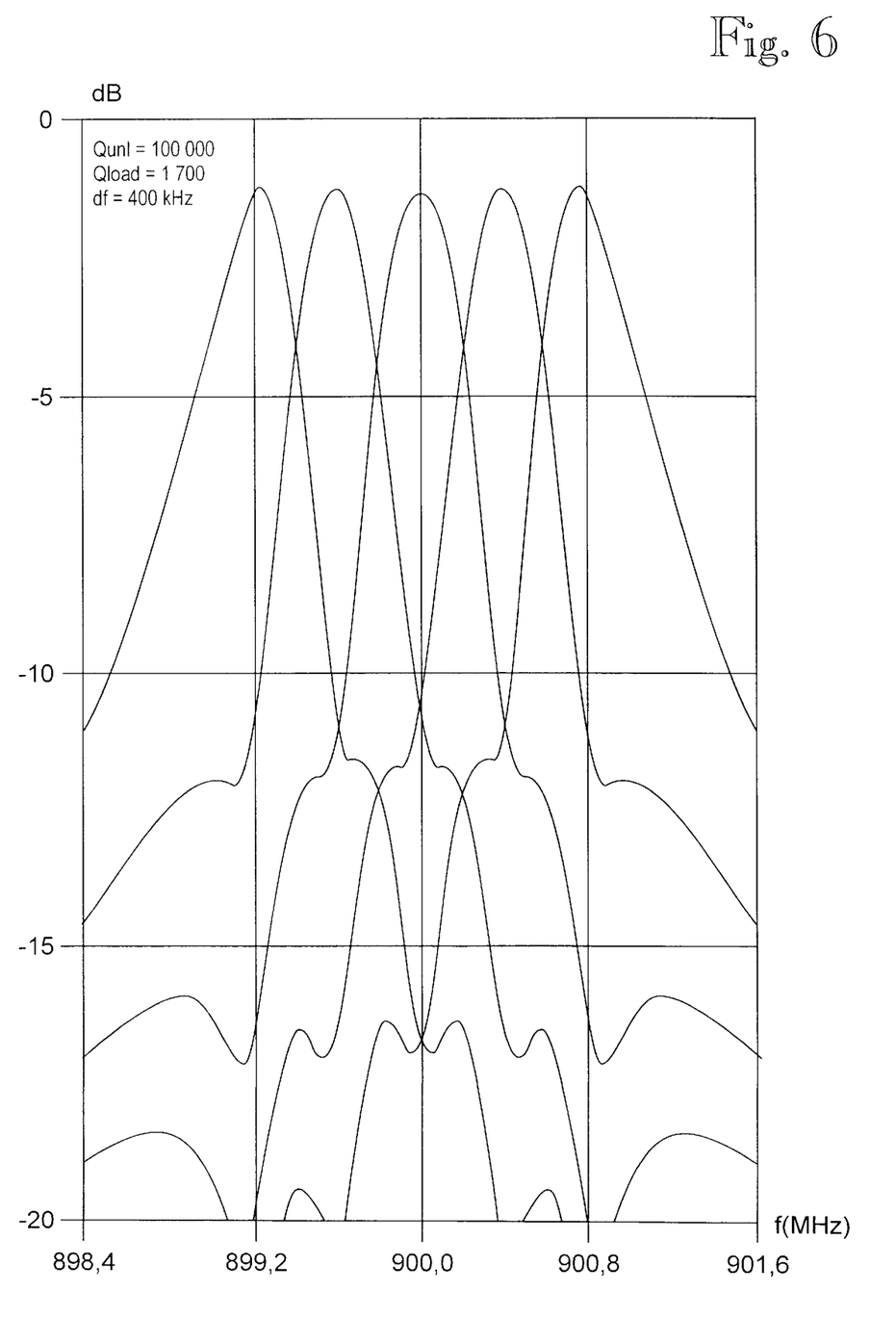

FIGS. 4 to 6 show frequency responses created as computer simulations with various quality factors Q. For a specific unloaded Q, an optimal loaded Q exists, minimizing the insertion loss. The loaded Q has a specific upper limit, otherwise the band pass of the filters would be too narrow.

The smallest useful Q of an unloaded resonator is 2000 for 400 kHz channel spacing. The insertion loss corresponding to this value is 7 dB. A lower factor of Q than this would cause too much interaction between adjacent channel resonators. This can be seen in FIG. 4. The maximum response of outer filters (those with the smallest and greatest centre frequency) is not exactly on the nominal frequency although the unloaded resonators are exactly on their nominal frequencies. When the attenuation of 7 dB thus generated is compared with the attenuation (7 or 10.5 dB) of the divider chain, it should also be noted that the solution of the invention eliminates the insertion loss of the broadband filter BPF2, the insertion loss being typically 1 to 2 dB. Also, in the solution of the invention, the insertion loss is the same to all branches of the receiver and it does not change significantly when branches are added.

FIG. 5 shows simulations corresponding to FIG. 4 but it uses a filter whose unloaded Q is 10,000. As can be seen in FIG. 5, in this case the selectivity is better and the insertion loss is only 3 dB. In FIG. 6 the unloaded Q is 100,000 in which case the insertion loss is only about 1 dB, which is mainly caused by the signal leaking into adjacent receivers. Generally the channels are not situated this close to one another, for which reason the insertion loss for Q factor 100,000 is only a fraction of one dB.

Figure 7:
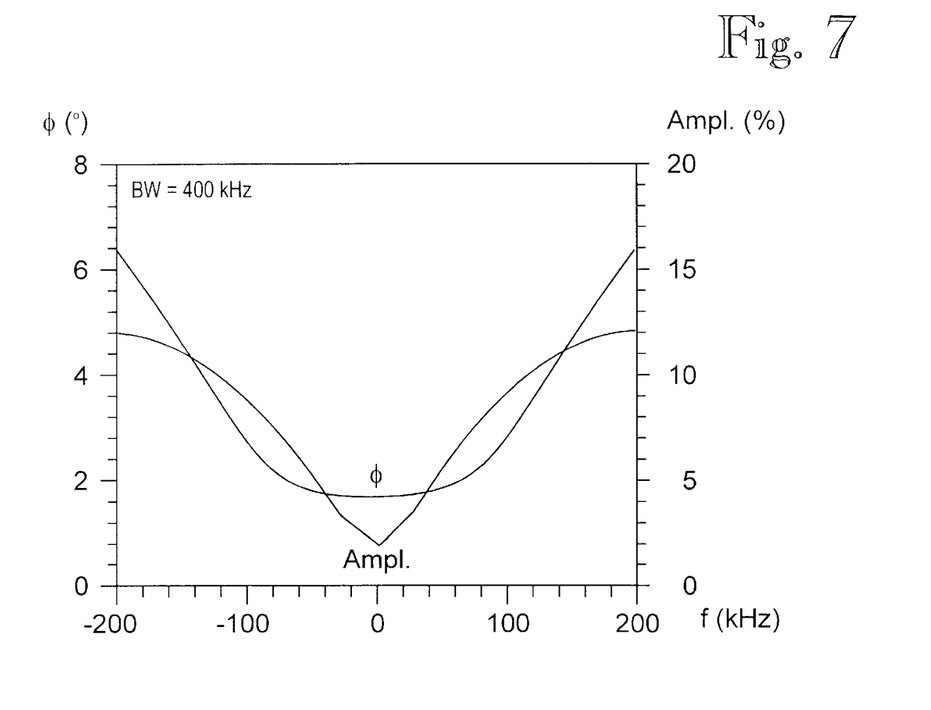
FIGS. 7 to 8 illustrate the requirements set for band-pass filters.
Figure 8:
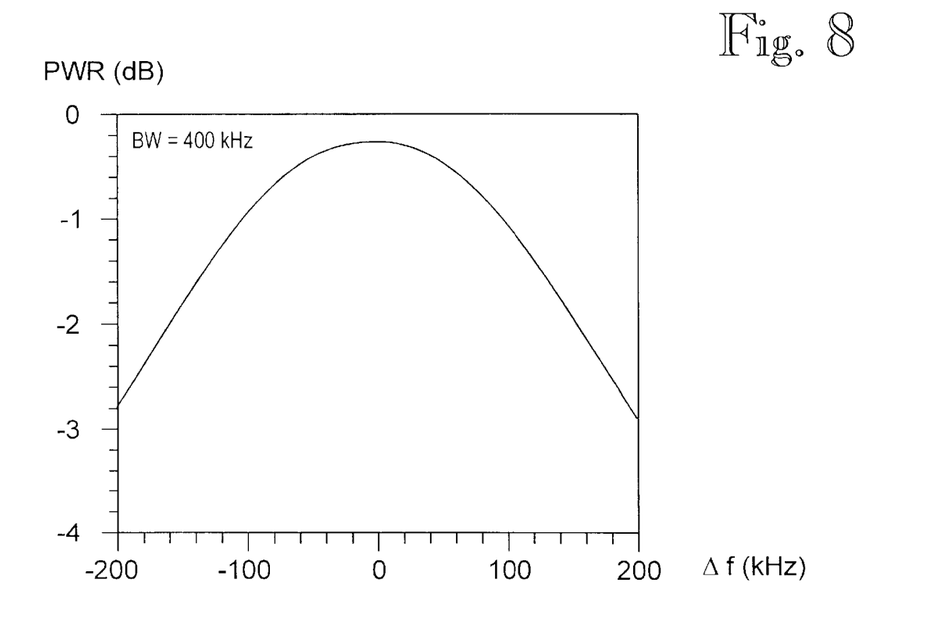

FIG. 7 created as simulations describes how the modulation of the signal distorts as a function of frequency offset in the case of a simple resonator having a 400 kHz bandwidth. FIG. 7 shows amplitude (AMPL) and phase ($\phi$). FIG. 8 correspondingly shows the attenuation of a modulated signal as a function of frequency offset. GMSK (Gaussian Minimum Shift Keying) modulation used in the GSM system takes place in theory at a constant amplitude but a frequency offset from the nominal frequency causes an increase in attenuation and a corresponding amplitude error.

It can be seen from FIGS. 7 and 8 that the filters can deviate 60 kHz from their nominal frequencies without a significant effect. Even an offset of 100 kHz would still be tolerable. It should be noted that the decoder (not shown) connected to the output of the receiver sees the filter as part of multipath attenuation and the equalizer (not shown) eliminates some of this distortion.

The dependence of a temperature uncompensated voltage-controlled resonator on temperature is typically 30 to 100 ppm/° C., that is, 27 to 90 kHz/° C. on the frequency range of 900 Mhz in GSM. Temperature dependence can be diminished by compensation techniques. However, it is obvious that resonators manufactured at present have to be placed in a location where temperature is kept constant.

Figure 9:
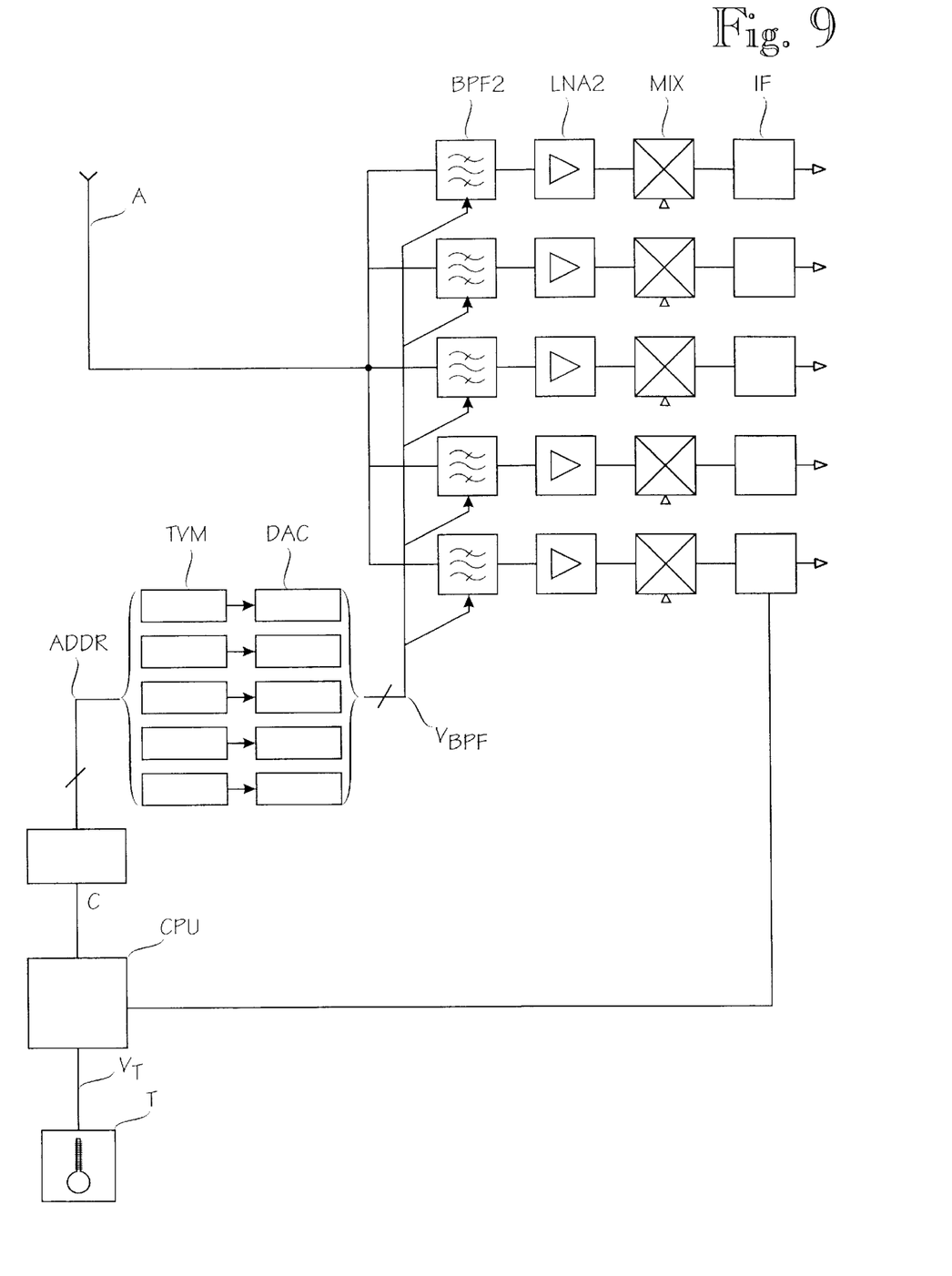
FIG. 9 shows a further advanced embodiment of the invention where the dependence of the centre frequency of the filters on temperature has been measured in advance.

One advanced embodiment of the invention is shown in FIG. 9. In this solution, the dependence of the frequency of the filters on temperature has been measured in advance (with a thermometer T) and stored in memory principally in the same way as the dependence of the frequencies of the filters on the control voltage explained in connection with FIG. 2. In this case more memory is of course needed. As an indicative example of the need for memory, 5 receivers, 50 frequencies, 100 temperatures and 2 bytes are assumed for each value of the control voltage of the filter. The total need of tuning voltage memory will be 50 kilobytes. This memory is preferably a non-volatile, reprogrammable memory. Suitable techinques are e.g. EAROM (Electrically Alterable Read Only Memory), Flash memory, CMOS memory with accumulator or battery backup, etc. Calibration information can also be written into an ordinary RAM memory whose contents are stored e.g. on a hard disk in case of power failures.

One method for implementing the tuning voltage memory TVM is to a great degree analogous to the memory arrangement of the display control of an industrial standard micro computer. In a computer display, the memory is part of the memory space of the processor and the display memory is arranged to have two ports, that is, it can be read to and written from simultaneously. The processor of the computer updates the contents of the memory asynchronously by processes carried out by the user, for instance. The display control reads the memory synchronously in step with the production of a video signal. In case of a colour display, three video signals have to be produced, one for each primary colour.

In this comparison the processor of the computer corresponds to a control unit of a radio station, the normal RAM memory of the computer corresponds to the RAM memory of the radio station, the display memory of the computer corresponds to the TVM tuning voltage memory of the invention, etc. The essential difference is, of course, that there are only three primary colours on the display of the computer, wherefore there are only three DAC circuits, whereas in the radio station of the invention, there is a flexible number of DAC circuits, the number being equal to the number of the branches of the receiver.

As an alternative to the contents of the tuning voltage memory TVM being determined in advance for each filter BPF2 and temperature, it is conceivable that a suitable technique is applied with this invention for forming a test loop between a transmitter and receiver of a radio station. One suitable test loop has been disclosed in the same Applicant's Finnish Patent 92,260. The use of the simple test loop disclosed in this patent restricts the capacity of the base station during calibration as in this technique separate time slots are reserved for transmission and reception. In order to define to which direction calibration is to be changed, three adjacent time slots have to be allocated to both transmission and reception directions, that is, six time slots altogether.

The reduction of capacity can be avoided by applying the technique disclosed in the same Applicant's Finnish Patent 92,966, on the basis of which test measurements are carried out in the time slots of an idle frame of a TCH/F+SACCH/TF channel structure according to ETSI/GSM recommendation 05.02 or in the time slots of an idle frame of an SDCCH/8 channel structure.

Alternatively, the tuning of a receiver may be carried out during one time slot in the following way. A test signal is sent with the transmitter. At the beginning of the time slot the centre frequency of the filter BPF2 is set by adjusting the control signal below the nominal frequency (or alternatively above it). During the time slot the control signal is adjusted to the direction that the centre frequency of the filter BPF2 approaches the nominal frequency and passes it by. At the same time, signal quality, such as signal strength and/or bit error rate, are measured continuously and the value of the control signal on which the signal quality attains its peak is stored in memory. For example, signal strength during one time slot would produce a graph of FIG. 8.

Such a solution is also conceivable that no separate test signal, but normal traffic is used for tuning the receiver. The receiver could be tuned so that the control signals of the filter BPF2 are changed repeatedly slightly upwards or downwards and a statistical study is made on whether the signal quality improves or deteriorates. The changes have to be so small that the operation of the receiver will not be impeded but so great, however, that it is possible to measure their effect.

The explanation above of the invention and its different embodiments are only intended to illustrate the principle of the invention. Various modifications are evident to those skilled in the art without deviating from the spirit and scope of the claims. It should be especially understood that an almost infinite number of different variations are available for controlling controllable filters. The invention has been explained by way of an example in connection with a base station of the GSM system, but it is evident that it can also be applied to other transmission techniques.

What is claimed is:

1. A method for controlling a multi-branch frequency-hopping receiver equipment used in a radio station, onto a desired frequency when a band-pass filter (BPF2) responsive to an external control signal ($V_{BPF}$) has been arranged for each branch of the receiver equipment, the control signal ($V_{BPF}$) of the band-pass filter being controlled in sync with frequency hopping, said method comprising;

determining the control signals ($V_{BPF}$) of the band-pass filter (BPF2) for each frequency (C) and each filter (BPF2) by calibrating said control signals ($V_{BPF}$) for each frequency and for each filter;

storing, in a tuning voltage memory (TVM), digital representations of the control signals determined in said determining step;

retrieving the digital representations of the control signals ($V_{BPF}$) of the band-pass filter (BPF2) from the memory (TVM) in sync with frequency hopping; and converting the retrieved digital representations into control signals of the band-pass filter (BPF2).

2. The method according to claim 1, further comprising:

classifying expected temperatures of the band-pass filter (BPF2) into predetermined classes; and wherein said step of determining the control signals comprises determining digital representations of the control signals ($V_{BPF}$) of the band-pass filters (BPF2) in advance for each class corresponding to a temperature; and said step of retrieving is carried out on the basis of the class corresponding to the prevailing temperature.

3. The method according to claim 1, wherein said steps of determining and storing are performed at predetermined times.

4. The method according to claim 1, wherein said steps of determining and storing are performed when there is a change in at least one condition selected from temperature, air pressure, and humidity.

5. The method according to claim 3 or 4, wherein said step of storing is carried out by storing the digital representations of the control signals ($V_{BPF}$) in the memory (TVM) in time slots of at least one of: an idle frame of a TCH/F+ SAACH/TF channel structure of a GSM system; and an idle frame of an SDCCH/8 channel structure.

6. The method according to claim 1, wherein said step of calibrating said control signals ($V_{BPF}$) comprises:

generating a test signal whose frequency corresponds to the nominal value of each frequency (C) for which the control signals are calibrated;

receiving said test signal at a frequency (C) for which the control signals are calibrated;

determining the quality of the received test signal;

changing the contents of the memory (TVM) for a frequency (C) for which the control signals are calibrated until the quality of the received signal attains an optimum value.

7. The method according to claim 6, wherein the test signal is generated by forming a transmission signal which deviates from the nominal value of a frequency (C) for which the control signals are calibrated by a duplex distance and converting the transmission signal by a duplex filter to a reception frequency.

8. The method according to claim 7, wherein the calibration of the control signals ($V_{BPF}$) of the band-pass filters (BPF2) further comprises the following steps carried out during a given time slot:

making the center frequency of a given filter (BPF2) deviate from the nominal value of a given frequency (C) by adjusting the control signal ($V_{BPF}$);

further adjusting the control signal ($V_{BPF}$) of the filter (BPF2) to a direction that causes the center frequency of the filter (BPF2) to approach the nominal value of the given frequency (C) and passes that nominal value; and measuring signal quality and storing in the memory the value of the control signal ($V_{BPF}$) of the given filter (BPF2) for which the quality of the received signal attains a peak.

9. The method according to claim 1, further comprising maintaining the temperature of the band-pass filters (BPF2) essentially constant.

10. The method according to claim 9, further comprising maintaining at least one of: the air pressure; and humidity to which the band-pass filters (BPF2) are exposed essentially constant.

11. The method according to claim 1 wherein said step of determining the control signals ($V_{BPF}$) of the band-pass filter (BPF2) comprises:

making repeated changes to one of: the control signals ($V_{BPF}$); and the digital representation stored in the memory (TVM); and determining statistically on which value of one of: each of the control signals ($V_{BPF}$); and each of the digital representations the quality of the received signal attains its peak, whereby the receiver can be calibrated without a separate test signal.

12. The method according to claim 1 wherein the radio station is a base station of a cellular radio system.

13. The method according to claim 1 wherein said step of converting is carried out with D/A converters (DAC).

14. A multi-branch frequency-hopping receiver equipment used in a radio station, comprising:

a plurality of receiver branches each containing a respective band-pass filter (BPF2), each said band-pass filter (BPF2) having an input, and a respective low-noise amplifier (LNA2) connected in the respective branch after the respective band-pass filter (BPF2);

a common antenna connected without amplification to the inputs of the band-pass filters (BPF2); and means connected to said band-pass filters (BPF2) for applying to each of said band-pass filters (BPF2) a respective external control signal ($V_{BPF}$) which is controlled in sync with frequency hopping in order to adjust the center frequency of each of said band-pass filters (BPF2) in response to the respective external control signal ($V_{BPF}$).

15. The receiver equipment according to claim 14, wherein each control signal ($V_{BPF}$) is a voltage.

16. The receiver equipment according to claim 14, wherein the radio station is a base station of a cellular radio system.

17. A multi-branch frequency-hopping receiver equipment used in a radio station, comprising:

a plurality of receiver branches each containing a respective band-pass filter (BPF2);

means connected to said band-pass filters (BPF2) for applying to each of said band-pass filters (BPF2) a respective external control signal ($V_{BPF}$) which is controlled in sync with frequency hopping in order to adjust the center frequency of each of said band-pass filters (BPF2) in response to the respective external control signal ($V_{BPF}$); and a control unit (CPU) and a memory (TVM) connected to said control unit (CPU), said memory (TVM) storing data representing the center frequencies of the band-pass filters (BPF2), which are measured in advance in response to the control signals ($V_{BPF}$), whereby an address (ADDR) of the memory (TVM) is responsive to the desired center frequency of a respective filter (BPF2) in a predetermined way.

18. The receiver equipment according to claim 17, wherein the memory (TVM) is a non-volatile memory.

19. The receiver equipment according to claim 17, wherein the memory (TVM) is a reprogrammable memory.

20. The receiver equipment according to claim 17, further comprising:

a temperature measuring means (T) providing temperature information (VT) that is operatively coupled to said control unit (CPU), and wherein the center frequencies of the band-pass filters (BPF2) in response to temperatures measured in advance are also stored in said memory (TVM), and each address (ADDR) of said memory (TVM) is responsive to the temperature measured by said temperature measuring means (T) in a predetermined way.

21. The receiver equipment according to claim 17, wherein the radio station is a base station of a cellular radio system.

* * * * *